INVENTOR
WADE WOLFE, JR.

BY *Robert H. Bachman*

ATTORNEY

United States Patent Office 3,450,193
Patented June 17, 1969

3,450,193
CORRUGATED TUBING
Wade Wolfe, Jr., Mount Carmel, Conn., assignor to Olin Mathieson Chemical Corporation, a corporation of Virginia
Filed Oct. 31, 1967, Ser. No. 679,458
Int. Cl. F28d 7/00
U.S. Cl. 165—1                                                    4 Claims

ABSTRACT OF THE DISCLOSURE

The instant disclosure teaches an improved corrugated tubing and an improved heat exchange system utilizing same. The corrugated tubing is characterized by a corrugated central section and two relatively smooth uncorrugated ends, with the diameter of the entrance end being larger than the diameter of the exit end.

---

Figure 1:
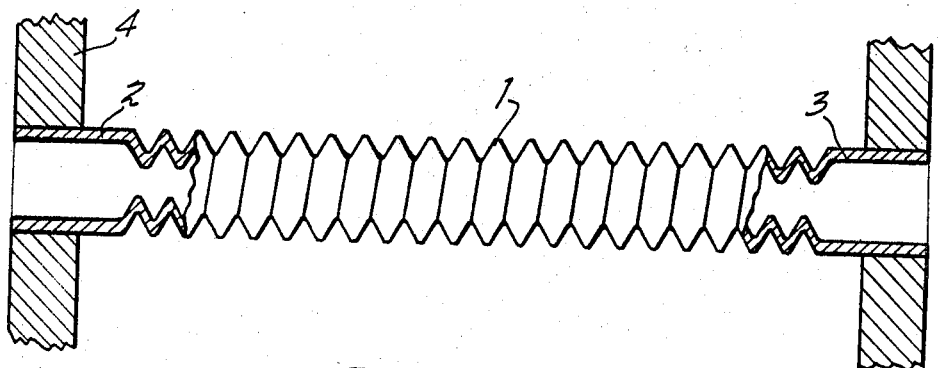

If a cylindrical tube of ductile material, particularly metal is twisted about its longitudinal axis, the tube wall is twisted into a spiral or helical configuration. Methods other than twisting are also known for providing helical or spiral configurations on a metal tube. A mandrel is normally inserted in the tube during the formation of the helical configuration in order to insure that a core of fixed diameter remains open along the center of the tube.

Spiral or helical shapes may also be obtained by means of dies or rotating tools which distort the tube wall into the shape of a spiral, with a particularly preferred apparatus being shown in copending application Ser. No. 679,459 for "Apparatus for Forming Corrugated Tubing," by Joseph Winter, filed of even date herewith. The pitch and depth of the spirals can be adjusted and controlled over a wide range of configurations.

It is known in the art that corrugated tubing provides improved heat transfer efficiency as compared to a plain cylindrical tube. In operation, a fluid is passed through the tube and the outside of the tube is contacted by condensing vapors, gases or liquids at temperatures different from the fluid inside the tube.

Thus, corrugated tubing provides a potentially large application in heat exchangers which normally use plain or uncorrugated tubing.

Frequently, heat exchangers consist of a bundle of spaced or parallel tubes or a multitude of U shaped tubes attached to tube sheets, which separate the heat transfer media on the outside from the heat transfer media on the inside of the tubes. This requires a good seal at the joint between the heat exchange tubes and the tube sheet which is often accomplished by rolling in the tubes or by welding or by brazing. Uniformly round tubes having a diameter very nearly the same as the holes in a tube sheet provide an attachment that can be most readily sealed.

Thus, when the tubing is corrugated, normally a section of the tubing is left uncorrugated to provide a plain undistorted tube wall at each end of the corrugated tubing for a locus for sealing into a tube sheet. Conventionally, the two plain ends have the configuration of the original tube, or only slightly different therefrom. Generally, both the exit and entrance ends of the tubing have very nearly the same diameter and generally the diameter of both the exit and entrance ends of the corrugated tubing are substantially larger than the minor internal diameter of the corrugated tubing.

Such configurations have disadvantages. As a fluid is passed through the tubing there is a reduction in velocity when it leaves the relatively small core and enters into the larger, uncorrugated exit end of the tubing. A pressure drop results. If sufficiently heated, a liquid can vaporize or flash or can expel dissolved gases at this point of reduced pressure. This results in an area of high turbulence which can and often does damage a tube wall by erosion, cavitation or erosion-corrosion thus, limiting the value of the corrugated tubing.

In some twisted or corrugated tube configurations there are spiraled convolutions of unsymmetrical cross sections. Thus, a different hydraulic flow occurs depending upon which direction a fluid is passed through the tube. Some investigators have found that significantly higher heat transfer rates occur when a liquid or fluid is passed in one direction rather than in the other direction. Consequently, great care must be taken to insure that all tubes are properly oriented in a heat exchange bundle, in the appropriate direction so that the maximum heat transfer rate can be achieved.

Accordingly, it is a principal object of the present invention to provide an improved corrugated tube configuration.

It is a further object of the present invention to provide an improved heat exchanger utilizing the aforesaid improved corrugated tube configuration.

A still further object of the present invention is the provision of an improved heat transfer system utilizing corrugated tubing.

Further objects and advantages of the present invention will appear hereinafter.

Figure 2:
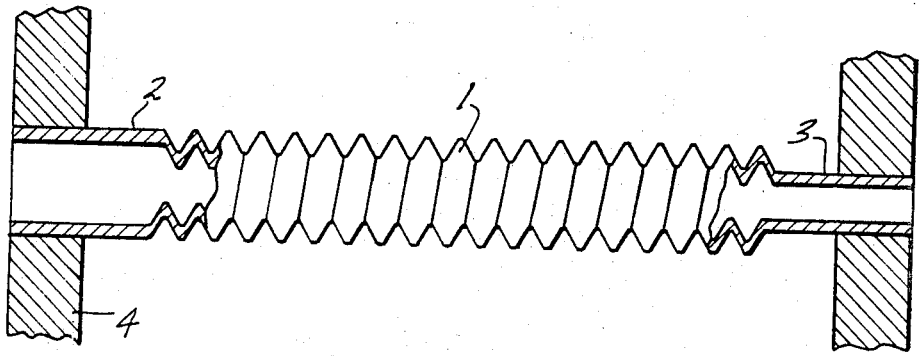

The present invention and improvements resulting therefrom will be more readily apparent from a consideration of the following specification and drawings wherein:

FIGURE 1 is a schematic view, partly in section, of a conventional heat transfer system utilizing corrugated tubing; and FIGURE 2 is a schematic view, partly in section, of an improved heat transfer system in accordance with the present invention utilizing the improved tubing of the present invention.

Referring to the drawings, it can be seen that conventional corrugated tubing as well as corrugated tubing of the present invention has a corrugated central section 1 and relatively smooth uncorrugated plain ends 2 and 3, with end 2 being the inlet end and end 3 being the outlet end.

In FIGURE 1 showing a conventional corrugated tubing, ends 2 and 3 have substantially the diameter of the original tube with the corrugated central section 1 having a substantially smaller minor internal diameter.

In accordance with FIGURE 2 showing the tubing of the present invention, inlet end 2 has substantially the same diameter as the original tube, but outlet end 3 has a substantially reduced internal diameter approximating the minor internal diameter of the central corrugated section 1.

As shown in FIGURES 1 and 2, the corrugated tubing is welded or brazed to tube sheet 4 so that the liquid inside the tubing enters inlet end 2, passes through central corrugated section 1 and exits via exit end 3.

It can be seen, therefore, that the tubing and heat exchange of the present invention avoids the aforementioned disadvantages of conventional configurations. In accordance with the present invention, flashing or gasing due to sudden pressure drop is avoided. Furthermore, the erosion-corrosion caused by such turbulence is also avoided.

In addition, since one end of the tubing is substantially smaller than the other end, there should be no confusion as to which direction a tube is inserted into a heat exchanger or as to which direction a fluid is passed in order to achieve maximum heat transfer efficiency.

Furthermore, in view of the foregoing, the heat exchange tubes of the present invention achieve significantly increased efficiency and longer life.

The present invention is, of course, readily amenable to use with any corrugated tubing irrespective of the method by which it is produced and also to corrugated tubing of a wide variety of materials. It is preferred, however, that corrugated metal tubing be used since it is here where the principal problems exist. A wide variety of metals or their alloys may, of course, be used such as copper and its alloys, aluminum and its alloys, iron and its alloys, titanium and its alloys, and so forth.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An improved corrugated tubing having a corrugated central section of substantially uniform diameter, a relatively smooth entrance end and a relatively smooth exit end, with the diameter of the entrance end being substantially larger than the diameter of the exit end, wherein the diameter of the exit end is substantially the same as the minor internal diameter of the corrugated central section.

2. A tubing according to claim 1 wherein the tubing is made of metal.

3. A process for improving heat transfer efficiency which comprises:
    (A) providing a corrugated metal tubing having a corrugated central section of substantially uniform diameter, a relatively smooth entrance end and a relatively smooth exit end, with the diameter of the entrance end being substantially larger than the diameter of the exit end, with the diameter of the exit end being substantially equal to the minor internal diameter of the corrugated central section;
    (B) affixing the said entrance and exit ends of the corrugated tubing to tube sheets;
    (C) passing a first liquid through the corrugated tubing; and
    (D) contacting the external surface of the corrugated tubing with a second fluid in heat transfer relationship with the first fluid.

4. An improved heat transfer system including:
    (A) providing a corrugated metal tubing having a corrugated central section of subtsantially uniform diameter, a relatively smooth entrance end and a relatively smooth exit end, with the diameter of the entrance end being substantially larger than the diameter of the exit end, with the diameter of the exit end being substantially equal to the minor internal diameter of the corrugated central section;
    (B) a first entrance tube sheet affixed to the entrance end of the corrugated tubing;
    (C) a second exit tube sheet affixed to the exit end of the corrugated tubing;
    (D) a first fluid passing through the corrugated tubing; and
    (E) a second fluid in contact with the external walls of the corrugated tubing in heat exchange relationship with the first fluid.

References Cited

UNITED STATES PATENTS

| | | | |
|---|---|---|---|
| 2,018,163 | 10/1935 | Wells | 165—147 |
| 2,864,591 | 12/1958 | Frink | 165—177 |

ROBERT A. O'LEARY, *Primary Examiner.*

C. SUKALO, *Assistant Examiner.*

U.S. Cl. X.R.

165—177